F. T. ROBERTS.
PROCESS AND APPARATUS FOR MAKING HOLLOW RUBBER ARTICLES.
APPLICATION FILED JUNE 24, 1918.

1,310,442.

Patented July 22, 1919.
2 SHEETS—SHEET 1.

Inventor:
Fred Thomas Roberts
By Baker Macklin Attys.

UNITED STATES PATENT OFFICE.

FRED THOMAS ROBERTS, OF CLEVELAND, OHIO, ASSIGNOR TO THE PARAMOUNT RUBBER COMPANY, OF CLEVELAND, OHIO, A CORPORATION OF OHIO.

PROCESS AND APPARATUS FOR MAKING HOLLOW RUBBER ARTICLES.

1,310,442.   Specification of Letters Patent.   Patented July 22, 1919.

Application filed June 24, 1918. Serial No. 241,467.

*To all whom it may concern:*

Be it known that I, FRED THOMAS ROBERTS, a citizen of the United States, residing at Cleveland, in the county of Cuyahoga and State of Ohio, have invented a certain new and useful Improvement in Processes and Apparatus for Making Hollow Rubber Articles, of which the following is a full, clear, and exact description, reference being had to the accompanying drawings.

This invention relates to hollow rubber articles which in their finished condition have an external opening. An illustration of such an article is a syringe bulb. The invention includes a new process for making such an article as well as a new apparatus which may be used in performing the process, and includes also an advantageous form of such article made by my process.

One of the objects of the invention is to provide for producing such articles as above referred to rapidly and in quantities, and by means which may be easily and economically carried out and operated. A more specific object is to make such articles from sheets of raw rubber stock, secure a substantially even thickness of wall of the article and form the openings from the article by the use of a mandrel whereby the inner surface of such openings are left smooth and cylindrical. Still another object is to so perform the steps of the process that the mandrel may be readily removed from the completed article, and may, while in position, expedite the transfer of the article to the vulcanizing mold and may also allow the use of internal fluid pressure during vulcanization, without difficulty arising from loss of pressure due to leakage through any unclosed part of the article. A specific object of the invention is to provide a method whereby the neck of the article may be reinforced by an additional amount of material without wastage and without interfering with the other steps of the process.

As to the apparatus, the object is to provide a very simple form of mechanism which may be readily used in effectively carrying out the process explained. Both the apparatus and process may be availed of to produce an advantageous and novel form of article, as hereinafter more fully explained.

My invention, including the process and apparatus above outlined and the articles particularly adapted to be made by them, is hereinafter more fully described in connection with the accompanying drawings; the essential characteristics are summarized in the claims.

Figure 1:
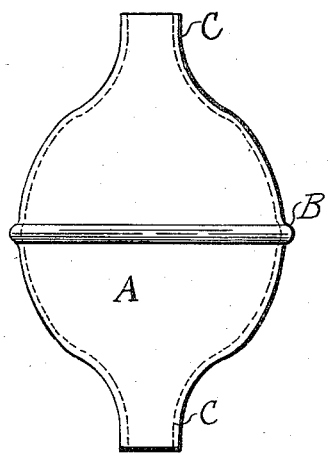
Figure 3:
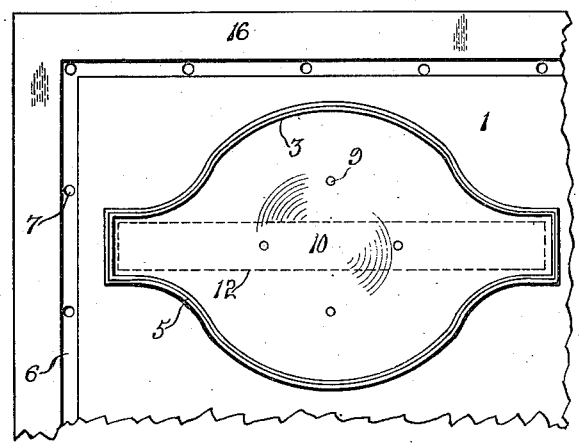
Figure 4:
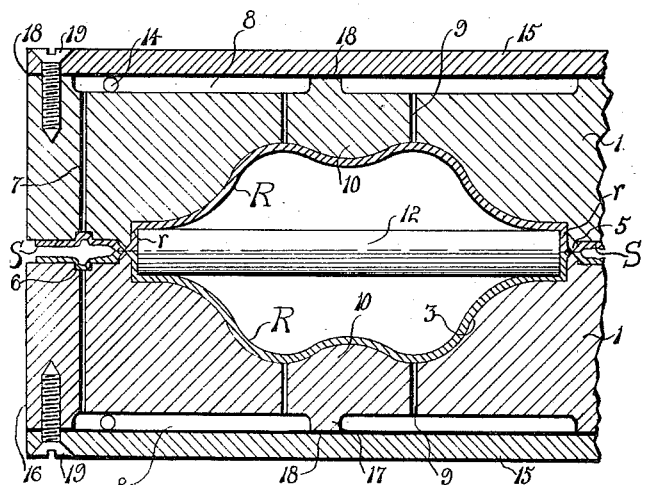
Figure 2:
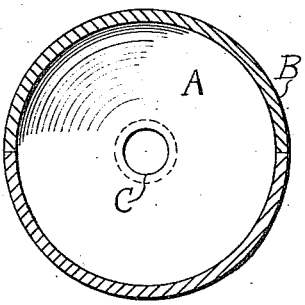
Figure 5:
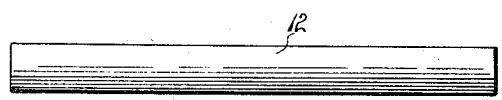
Figure 6:
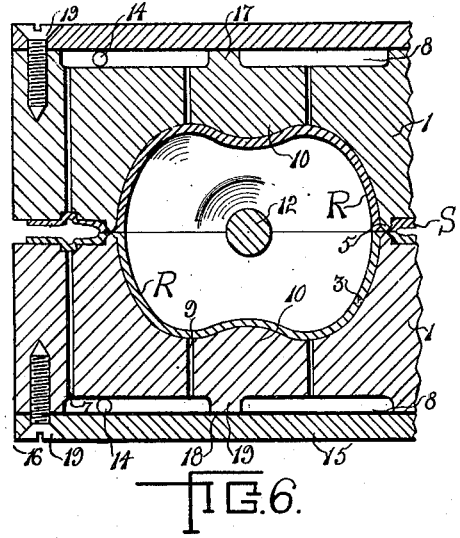
Figure 7:
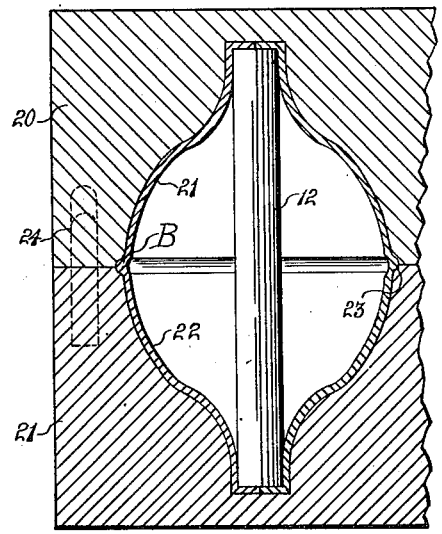
Figure 8:
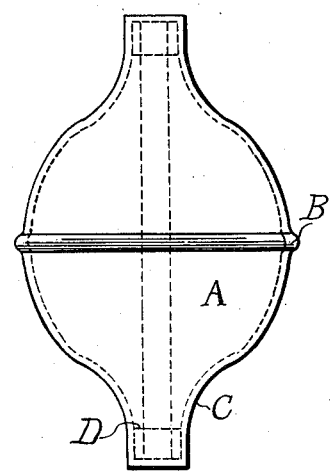
Figure 11:
Figure 9:
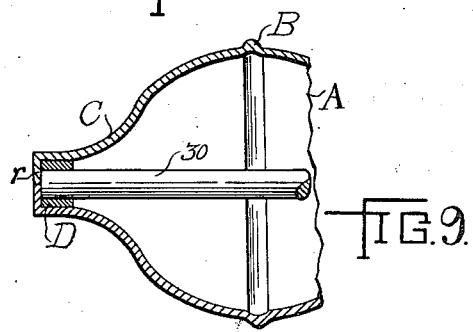
Figure 10:
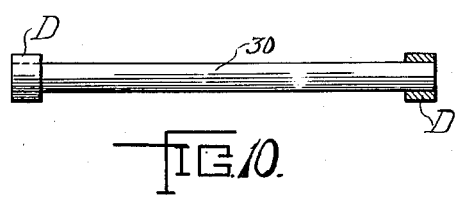

In the drawings, Figure 1 is a side elevation of the completed article; Fig. 2 is a transverse central section through the same; Fig. 3 is a plan of either of two mold members for making such an article; Fig. 4 is a section taken longitudinally through the article in the forming mold; Fig. 5 is a view of the mandrel member removed; Fig. 6 is a transverse section through the central part of the article in the mold; Fig. 7 is a vertical section taken longitudinally through the article in the vulcanizing mold; Fig. 8 shows a modified form of the article after removing it from the vulcanizing mold, being an outside elevation thereof; Fig. 9 is a longitudinal section through a portion of the article shown in Fig. 8; Fig. 10 is a view of the mandrel of Figs. 8 and 9 removed; Fig. 11 is a view showing a rubber tube cut into short sections for reinforcing rings.

In the making of syringe bulbs and similar articles, it has heretofore been customary to form the article of two or more parts by means of male and female dies, which parts are thereafter united and vulcanized. The rubber is usually thickened or left solid at the neck, and after vulcanization of the closed article, the neck portions are drilled out to form the openings. I have found that a more perfect article, as well as greater rapidity in its manufacture, may be accomplished by the use of molds in which stock in the nature of uniform comparatively thin sheets is pneumatically seated in the cavities, and by my invention time and material may be saved in the forming of the neck opening by the use of a readily removable mandrel extending axially through the article.

Referring first to Figs. 1 and 2, A indicates a syringe bulb having a substantially spherical body carrying a circumferential bead B, and tapering outwardly at opposite ends to contracted neck portions C, which have the internal surfaces comparatively smooth and cylindrical for a short distance to engage the exterior of communicating tubes with which the bulb is designed to operate.

In Figs. 3, 4 and 6 are shown forming mold members comprising plate-like bodies 1, in which may be formed any suitable number of cavities 3, each shaped to form half of the syringe bulb. The cavities are shown as surrounded by raised beveled ribs providing cutting edges 5 adapted to meet when the molds are brought together and sever the sheet from which the articles are formed from the material within the cavities. These knife edges are shown as extending entirely around the cavities.

S, in Figs. 4 and 6, indicates raw rubber sheet stock which may be laid over the cavities and be clamped around the edges of the mold plates and then drawn into the cavities, as shown at R in Figs. 4 and 6. The clamping is accomplished pneumatically by means of a groove 6 extending entirely around the cavities and communicating through openings 7 with the vacuum chamber 8 in each mold plate. These chambers may be exhausted by means of any suitable vacuum-producing device connected with the mold plates. The opening 9 from the chambers 8 indicate points of application in suitable suction connections for exhausting the chambers and cavities. The mold plates may be carried in a suitable press for forcibly bringing them together and conveniently separating them after formation of the articles. My Patent No. 1,201,502, issued October 17, 1916, illustrated one form of mold press and vacuum connection from the mold plates which could be advantageously employed with the molds of the present invention.

As the sheets are laid over the cavities, their edges are retained by the clamping grooves 6, the applied suction drawing the sheets firmly into these grooves serving to hold the edges of the sheets while continued application of the vacuum acts through passages extending from the bottom of the cavities to the vacuum chambers 8, whereby the stock across the mold cavities is evenly seated in the cavities against the surface thereof.

In the forming of a hollow article of such pronounced convexity as a syringe bulb the drawing of sheet stock into correspondingly shaped cavities would cause the stock to be stretched and thinned in the central region as it approaches the base of the cavity, thus producing an uneven thickness of wall. To overcome this I provide fixed raised humps 10 in the bottom of each cavity. The effect of such a hump is to cause a portion of the rubber to extend inwardly, but as the superficial area of the hump is equivalent to the corresponding surface of the finished article, the rubber covering the hump is not distended when the inward protuberance becomes outwardly bowed in the finished shape of the article. The hump prevents the rubber from being appreciably stretched or thinned when drawn into the cavity, so that the finished article has a wall of substantially uniform thickness.

After the rubber has been drawn into the cavities, I may place a mandrel member 12 in one of the rubber-lined cavities and bring the mold members together over the same. This member 12 is shown as a cylindrical bar of such length that its ends may fit the interior of the neck of the article while the rubber in the cavities is closed around the ends of the mandrel as shown at r. Thus when the molds are brought completely together, the knives 5 sever the article from the surrounding sheet and cause the uniting of the parts in the coacting molds forming a diametric longitudinal seam making a complete circuit and closing the article with the mandrel member therein.

Before closing the article, any suitable expansible material (such as ammonia powder or water) is placed within the article so that, when subjected to heat in the vulcanizing mold, proper internal pressure may be created. The molds may now be separated and the article removed and placed in a vulcanizing mold such as shown in Fig. 7 in which two mold members 20 and 21 are provided with cavities, each conforming to half of the completed article and adapted when brought together to register and meet along a plane at right angles to the plane of the seams formed by the forming molds. These cavities 21 and 22 snugly embrace the article when the mold members are brought together as shown in Fig. 7.

In the face of each vulcanizing mold member, at the edge of the cavity is an annular recessed or chamfered portion 23 forming a groove when the parts are brought together. In placing the articles in the vulcanizing molds, one end is thrust into the contracted bottom portion of the cavity 22, which operation is expedited by reason of the mandrel bar 12. A number of articles may thus be placed in a vulcanizing mold having a plurality of such cavities, and the corresponding mold member 20 may be placed over the upper part of the cavities being guided into position by dowel pins, such as indicated at 24.

The closing of the vulcanizing mold members over the article tends to squeeze the material at the meeting surfaces of the mold members thus filling the groove 23 and forming the bead B. As the internal pressure is generated in the article by the application of heat, the article is expanded forcibly into contact with the vulcanizing walls and as the article is entirely closed there can be no leakage of internal pressure, but as the outwardly pressed rubber tends to escape at the meeting surfaces of the mold members, the rubber is forced into the grooves 23, thus forming the bead B.

After completing the vulcanization, it is only necessary to sever the article across the ends of the mandrel 12, and longitudinally remove this mandrel. The use of the mandrel insures smooth cylindrical surfaces in each neck, for closely engaging a tubular member or the like to be connected with the syringe bulb B.

Referring next to Figs. 8 to 11, I have here shown a method of reinforcing or thickening the material at the neck of the article adapted to be used in this process. Here the article is shown as having a body A, bead B and neck portion C, reinforced by tubular ring-like pieces D, which in the finished article are integral parts of the neck. A mandrel 30 similar to the mandrel 12, but smaller in diameter is shown as carrying at each end the collar D in the nature of a short tubular section or ring of rubber. These sections may be conveniently made from the raw rubber stock put through the usual tubing machine to form a tube indicated at T, Fig. 11, cut along the lines $t$, forming the short sections D.

In making the article with the reinforced neck, the process above described is carried out in precisely the same fashion except that the mandrel 30 with the raw rubber sections D on each end is substituted for the mandrel 12, the parts being then brought together and forming the article which is vulcanized as described. It will be noted that in this case as before the rubber at the ends of the neck of the article is closed over the ends of the mandrel. The rubber sections D are firmly united to the wall C of the article by vulcanization, while the smooth mandrel insures a smooth bore for the reinforces. After vulcanization, the closed ends $r$ may be severed by cutting across the end of the mandrel or by cutting in against the side of the mandrel adjacent its ends. Thereafter the mandrel may be readily removed longitudinally, leaving the sections D integrally united with the surrounding portion of the article.

Referring to the construction of the vacuum mold illustrated in Figs. 4 and 6, it will be seen that the vacuum cavity 8 is made by a recess in the base of the mold plate covered by a backing plate 15 which makes an air-tight connection with edge rib portions 16 of the mold plate. Intermediately the mold plate is braced and supported by integral lugs thereof 17, which abut the inner surface of the plate 15. If desired a suitable gasket or paint-filling (indicated at 18) may be employed between the ribs 16 and the backing plate 15 to insure an air-tight connection, and the backing plate may be conveniently secured in place by screws 19 countersunk into the backing plate and extending into the rib portion of the mold plate.

The construction just described has great advantages of manufacture. The mold plate may be readily cast with the edge rib and lugs thereon and then the faces of the ribs and lug may be machined off to a true plane at one operation in a planing machine; then the backing plate of ordinary rolled sheet metal may be secured in place. Where a gasket 18 is employed a portion of the same gasket material is preferably located between the lugs 17 and the backing plate to preserve the support of the mold member in the simplest manner. The method described produces a more satisfactory construction as well as a cheaper one than where the mold member is cast with the vacuum chamber entirely within it.

Having thus described my invention, what I claim is:

1. The method of making hollow rubber articles, comprising seating stock for the article in cavities in two coöperating molds, bringing two of such cavities when lined with rubber into coaction to inclose a mandrel, and embrace a portion thereof while another portion of the mandrel is out of contact with such lining, thereafter vulcanizing the article with the mandrel inclosed, then severing a portion of the article, and removing the mandrel through the opening thus provided.

2. The method of forming hollow articles, consisting of pneumatically seating sheet stock in the cavities of mold members, each cavity being surrounded by a cutting edge, bringing the two cavities thus lined into coaction to inclose a mandrel and to cut off the material entirely around the exterior of the article, and thereafter severing a portion of the article and removing the mandrel.

3. The method of making hollow rubber articles provided with a neck, consisting of pneumatically seating sheet rubber stock in the cavities of mold members, each cavity being surrounded by a cutting edge, bringing the two cavities thus lined with rubber into coaction to inclose a mandrel which occupies the neck but is out of contact with the body of the article, and to cut off the rubber entirely around the exterior of the article, then vulcanizing the article with the mandrel within it, then severing a portion of the article and removing the mandrel.

4. The process of making hollow rubber articles, consisting of pneumatically forming the article as a single unit with a mandrel inclosed within it, vulcanizing the article with the mandrel inclosed, then severing a portion of the article, and removing the mandrel through the opening thus provided.

5. The process of making hollow rubber articles, consisting of pneumatically seating sheet stock in the cavities of two mold members, placing in one of the mold members after the stock is seated therein a mandrel, bringing the two members together to cause the mandrel to be snugly embraced by seated rubber stock and to sever the parts of the article from the remaining stock and join such parts to each other, thereafter severing a portion of the article, and removing the mandrel through the opening thus provided.

6. The process of making hollow rubber articles, consisting of pneumatically seating sheet stock in the cavities of two mold members, placing in one of the mold members after the stock is seated therein a mandrel, bringing the two members together to cause the mandrel to be snugly embraced by seated rubber stock and to join such parts to each other, thereafter transferring the article with its inclosed and positioned mandrel to a vulcanizing mold and vulcanizing it, thereafter severing a portion of the article to produce an opening, and removing the mandrel through such opening.

7. The process of making hollow rubber articles, consisting of seating raw rubber sheet stock in the cavities of two mold members, placing in one of the mold members a mandrel extending across the article and snugly embraced by the article adjacent to the ends of the mandrel while out of contact therewith, bringing the other seated part of the article into conjunction with the part first mentioned and with the mandrel, vulcanizing the article with the mandrel in place, severing a portion of the article adjacent the end of the mandrel, and removing the mandrel.

8. The process of making syringe bulbs and similar articles consisting of seating stock for the article in mold cavities, placing within the mold a mandrel, the end portions of which at least are substantially cylindrical and engage the interior of the article adjacent to the ends, bringing another mold member with seated stock into conjunction with the first mold member and the mandrel to form the article, and thereafter severing the article adjacent one end and removing the mandrel.

9. The process of making syringe bulbs and similar articles consisting of pneumatically seating stock for the article in mold cavities, placing within the mold a mandrel, the end portions of which engage the interior of the article adjacent to the ends, bringing another mold member with seated stock into conjunction with the first mold member and the mandrel to form the article, vulcanizing the article with the mandrel inclosed, and thereafter severing the article adjacent one end and removing the mandrel.

10. The process of making syringe bulbs and similar articles, consisting of pneumatically seating in mold cavities sheet rubber stock adapted to form each a longitudinal section of the bulb with a trough-like end portion having rubber extending across its extreme end, placing a mandrel within the seated stock, the mandrel resting in such trough-like portions and substantially abutting the extreme end portions of the stock, bringing another mold member with seated stock into conjunction with the first mentioned member and the mandrel, cutting off the surplus stock around the exterior of the article by means of the pressure of the mold members upon each other, vulcanizing the article, cutting off the extreme ends of the article adjacent to the ends of the mandrel, and removing the mandrel.

11. The process of making a syringe bulb or like article consisting of seating rubber sheet stock in a mold cavity adapted to form a longitudinal portion of the article, placing other sheet stock in another cavity, placing a mandrel extending longitudinally within one of the mold cavities on the seated stock therein, said mandrel substantially abutting the end portions of the stock, bringing the other mold member with seated stock into conjunction to cut the surplus stock away from the article and form a seam entirely about the article, then vulcanizing the article with the mandrel in place, then cutting off the end portion of the article adjacent to the end of the mandrel, and removing the mandrel through the opening thus provided.

12. The process of making syringe bulbs or similar articles, consisting of forming the article in two longitudinal halves about an inclosed longitudinal mandrel, then placing the article with the mandrel in a vulcanizing mold, each having a cavity corresponding to half of the article divided transversely, removing the article from the vulcanizing mold, cutting off the end portions of the article, and removing the mandrel.

13. The process of making a syringe bulb or like article consisting of seating rubber sheet stock in cavities of two mold members, each cavity adapted to form half of the article divided longitudinally, placing a mandrel extending longitudinally within one of the mold cavities on the seated stock therein, bringing the other mold member with seated stock into conjunction to form a seam entirely about the article, then transferring the article with its inclosed mandrel to a vulcanizing mold composed of two cavities, each corresponding to half the article divided transversely, vulcanizing the article therein, removing it, cutting off the ends of the article, and removing the mandrel.

14. The method of making syringe bulbs or similar articles, consisting of forming the bulb in two longitudinal halves joined by longitudinal seams, placing the bulb in a vulcanizing mold separable on the lateral diameter on the article, said vulcanizing mold being provided with an annular groove in it at the plane of separation, and vulcanizing the article in such mold.

15. The method of making syringe bulbs or similar articles consisting of forming the bulb in two longitudinal halves about an inclosed longitudinal mandrel, placing the bulb with its mandrel in a vulcanizing mold separable on the lateral diameter on the article, said vulcanizing mold being provided with an annular groove in it at the plane of separation, vulcanizing the article in such mold, removing the article, cutting off the portion opposite the end of the mandrel, and removing the mandrel.

16. The process of forming hollow rubber articles, consisting of seating rubber stock for the article in two mold cavities, placing of such seated stock in one of the cavities a mandrel surrounded by a rubber ring which ring engages the interior of the seated stock, and thereafter removing the mandrel while leaving the ring in place as a reinforce for the interior of the article.

17. The process of making syringe bulbs or similar articles, consisting of seating rubber stock for the article in two mold cavities, placing of such seated stock in one of the cavities a mandrel surrounded by a rubber ring at one end which ring engages the interior of the seated stock, vulcanizing the article, severing the end portion thereof, and removing the mandrel while leaving the ring in place as a reinforce for the interior of the article.

18. The process of making rubber syringe bulbs or similar articles, consisting of seating rubber stock for two portions of the article in two mold cavities, placing on such seated stock in one of the cavities a mandrel carrying a rubber ring snugly seating against the interior of the seated stock, bringing another mold member with stock seated therein into conjunction with the first mentioned member and ring on the mandrel, at the same time cutting off the rubber about the article and forming a seam, then vulcanizing the article with the inclosed mandrel and rings, then cutting open the vulcanized article, and shoving the mandrel longitudinally out of the article, leaving the ring in place as an internal reinforce.

19. The process of making rubber syringe bulbs or similar articles, consisting of seating rubber stock for two portions of the article in two mold cavities, placing on such seated stock in one of the cavities a mandrel carrying rubber rings adjacent to its ends, said rings snugly seating in troughlike end portions of said seated stock, bringing another mold member with stock seated therein into conjunction with the first mentioned member and mandrel, at the same time cutting off the rubber about the entire article, then vulcanizing the article with the inclosed mandrel and rings, then cutting off the ends of the vulcanized article, and shoving the mandrel longitudinally out of the article, leaving the rings in place as internal reinforces.

20. The method of making rubber syringe bulbs and similar articles consisting of seating rubber stock in mold cavities, cutting off a section of a rubber tube and placing it on a rod adjacent to the end, placing the rod with such rubber ring therein in a mold having seated stock and bringing another mold member into conjunction and by pressure severing the surplus stock and joining the article by a continuous seam, thereafter vulcanizing the article with the mandrel in place, severing the end portion of the article adjacent to said ring, and removing the mandrel.

21. The method of making rubber syringe bulbs and similar articles consisting of seating rubber stock in mold cavities, cutting off sections of the rubber tube and placing them on a rod adjacent to the ends, placing the rod with such rubber ring sections in a mold having seated stock and bringing another mold member into conjunction and by pressure joining the article by a continuous seam, thereafter vulcanizing the article with the mandrel in place, severing the end portions of the article adjacent to said rings, and removing the mandrel while leaving the rings in place.

22. The method of making a hollow rubber article consisting of pneumatically seating raw rubber sheets in a forming mold arranged to make a closed article, placing a mandrel member within such rubber lined mold cavity, bringing the edges of the stock in the mold together and uniting them, severing the material in the surrounding sheet and vulcanizing the article so formed, and then removing the mandrel by cutting the material inclosing the same.

23. The method of making a hollow rubber article having an opening in its finished form, consisting of shaping raw rubber stock in a forming mold arranged to make a completely closed article, then bringing the mold members together on a mandrel which is of materially less maximum girth than the interior of the largest cross section of the article, thereby inclosing the mandrel, vulcanizing the article by the use of internal pressure and then forming the opening of the finished article and removing the mandrel therefrom.

24. An apparatus for making hollow rubber articles, comprising a pair of coacting cavitary mold members and a mandrel having such length in relation to the mold cavities that it may be housed within rubber stock seated in the cavities while terminating sufficiently short of the ends of the cavities so that the rubber may extend entirely across the ends of the mandrel and make a closed article.

25. In an apparatus for making hollow rubber articles, a pair of mold members, each having a cavity, the end portions of which are reduced in cross section, combined with a mandrel adapted to seat in such end portions upon rubber stock seated in the cavities, said mandrel at its ends abutting the end walls of the seated stock.

26. In an apparatus for making hollow rubber articles, a pair of mold members, each having a cavity, the end portions of which are reduced in cross section, combined with a mandrel adapted to seat in such end portions upon rubber stock seated in the cavities, said mandrel extending across but out of contact with the intermediate portion of the seated sock.

27. In an apparatus for making hollow rubber articles, the combination of two mold members, each having a cavity, said cavities coacting to surround an enlarged space for the body of the article and a reduced space for the neck portion of the article, and a mandrel consisting of a rod adapted to be seated within the cavities and be supported by the neck portion thereof and substantially abutted at its end by the end wall of such neck portion.

28. In an apparatus for making hollow rubber articles, the combination of two mold members, each having a cavity, said cavities coacting to surround an enlarged central space for the body of the article and reduced approximately cylindrical neck portions for the article, and a mandrel consisting of a rod adapted to be seated within the cavities and supported by the neck portions thereof and substantially abutted at its ends by the end walls of such neck portions.

29. In an apparatus for making hollow rubber articles, the combination of two mold members, each having a cavity, said cavities coacting to surround an enlarged space for the body of the article and a reduced neck portion, and a mandrel consisting of a rod adapted to lie within the cavities, said rod being of smaller cross section than the internal dimension of the neck portion whereby the rod may be surrounded by a reinforcing ring adapted to engage the interior of said neck portion.

30. In an apparatus for making hollow rubber articles, the combination of two mold members, each having a cavity, said cavities coacting to surround an enlarged central space for the body of the article and reduced approximately cylindrical neck portions for the article, and a mandrel consisting of a rod adapted to occupy the cavities and having cylindrical end portions adapted to be surrounded by the neck portions thereof and substantially abutted at its ends by the end wall of such neck portions, said rod being of less diameter than the internal diameter of the neck portions whereby it may be surrounded by reinforcing rings adapted to engage the interior of said neck portions.

31. In apparatus for making hollow rubber articles, a forming mold comprising a pair of coacting cavitary mold members and a mandrel having such length in relation to the mold cavities that it may be housed within rubber stock seated in the cavities and be inclosed at its ends by such stock, said forming mold being separable longitudinally of the mold, and a vulcanizing mold having its cavity divided transversely of the direction of the mandrel.

32. In apparatus for making hollow rubber articles a forming mold divided longitudinally of the article to be formed, a vulcanizing mold divided transversely of the article, and a mandrel adapted to be inclosed within the article formed and adapted to brace the article during its insertion in the vulcanizing mold.

33. An apparatus for making hollow rubber articles comprising a pair of coacting cavitary mold members and a mandrel of such girth that it is out of contact with material seated in the intermediate portion of the cavities but may engage portions adjacent to the ends, said mandrel having such length that it may be housed within rubber stock seated in the cavities with such stock extending over the ends of the mandrel.

34. In an apparatus for making rubber bulbs, the combination of two coacting cavitary mold members separable longitudinally of the bulb, and a cylindrical mandrel having a diameter substantially that of the opening through the neck of the bulb and materially less than the internal diameter of the body of the bulb.

35. In an apparatus for making hollow rubber articles, the combination with separable mold members, each having a cavity in which rubber stock may be seated, and a mandrel adapted to be housed within the mold members and entirely surrounded by rubber stock seated therein, said mandrel engaging such stock for only a portion of its length and having the portion which does not engage the stock of no larger cross section than the engaging portion, whereby the mandrel may be drawn out through the opening defined by the engaging portion.

36. The combination of a pair of cavitary mold members, each having a central depression for the body of the article and reduced depressions at the ends for necks on the article, a cylindrical mandrel adapted to be embraced by neck portions of stock seated in the cavities while out of contact with the intermediate portions, said mandrel terminating sufficiently short of the ends of the cavities to enable rubber stock to extend entirely across such ends and form a closed article with the mandrel in the interior.

37. The method of making a hollow rubber article having a permanent opening therein comprising forming the article as a completely closed article about a mandrel which seats within the article adjacent to the opening and is not materially larger in girth than the opening, and after the formation of the article severing it adjacent to the end of the mandrel to provide the opening, and withdrawing the mandrel through such opening.

38. The method of making hollow rubber articles comprising bringing together two parts of rubber stock to completely inclose a mandrel lying in the plane of junction of the two parts, thereafter vulcanizing the article with the mandrel within it in a vulcanizing mold having its plane of separation transverse of the mandrel, and after vulcanization severing the article adjacent to the end of the mandrel and withdrawing the mandrel through the opening thus provided.

39. The method of making hollow rubber articles consisting of forming a tubular body closed at its ends from two sheets of rubber joined by a longitudinal seam, supplying internal pressure and vulcanizing the article with such pressure, and then severing the article transversely.

In testimony whereof I hereunto affix my signature.

FRED THOMAS ROBERTS.